J. R. REYBURN.
TIRE GRIP TIGHTENER.
APPLICATION FILED NOV. 1, 1919.
1,340,184.
Patented May 18, 1920.
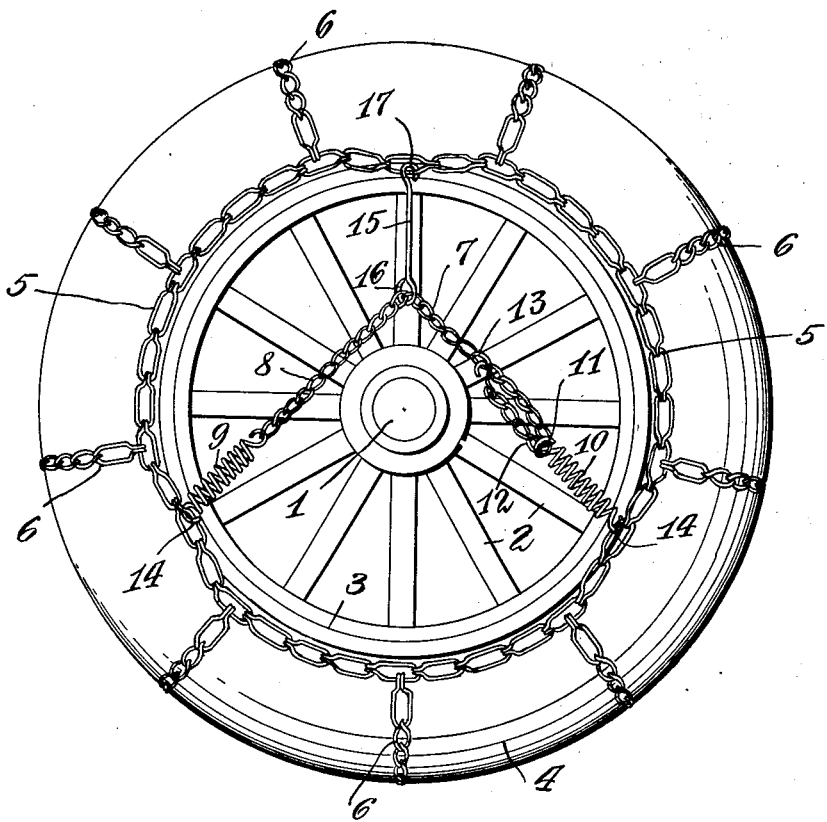
Inventor
John R Reyburn

UNITED STATES PATENT OFFICE.

JOHN R. REYBURN, OF BRIDGEPORT, CONNECTICUT, ASSIGNOR TO AMERICAN CHAIN COMPANY, A CORPORATION OF NEW YORK.

TIRE-GRIP TIGHTENER.

1,340,184.  Specification of Letters Patent.  Patented May 18, 1920.

Application filed November 1, 1919. Serial No. 334,930.

*To all whom it may concern:*

Be it known that I, JOHN R. REYBURN, a citizen of the United States, residing at Bridgeport, in the State of Connecticut, have invented certain new and useful Improvements in Tire-Grip Tighteners, of which the following, taken in connection with the accompanying drawing, is a specification.

This invention relates especially to tighteners or take-up devices for use in connection with a well-known type of tire grip comprising, generally described, two flexible members adapted to be arranged in annular form one on each side of a vehicle wheel and concentric therewith and connected at intervals by tread members passing transversely about the periphery of the tire.

The object of my invention is the construction of such a device as will not scrape or abrade under ordinary surface conditions, the hub of the wheel to which the tire grip is applied.

The accompanying drawing shows a side view of my device applied to a tire grip of the general type hereinbefore described, the wheel to which the latter is applied comprising the usual hub 1, spokes 2, rim 3 and equipped with the tire 4. The tire grip comprises two flexible circular members preferably of chain of which one only is indicated at 5, the other being located on the opposite side of the wheel and being in all essential respects similar to the one shown in the drawing. The circular members are connected at intervals by the cross chain 6. The complete tightening device may comprise any suitable tightener some portion of which is preferably composed of a longitudinally resilient member or members and also a connecting member hereinafter further described. In my drawing I show the intermediate portion of the tightener as composed of a section of light chain 8 and the free end portions as composed of springs 9 and 10, the latter constituting the resilient members referred to. The connection between one of the springs, for example that designated at 10 and the end of the chain may be effected by a ring 11 at the end of the spring through which may pass the loop 12 formed from the chain and adjustable in length by means of the hook 13 adapted for engagement with any one of a number of the links of the chain. Suitable means for detachably engaging the two free ends of the tightener to the side chain are provided consisting preferably of the hooks 14—14 each of which is adapted to engage any link of the circular member of the tire grip. A non-extensible connecting member which may consist if desired of a single link 15, as shown, is provided, having an eye 16 at one end and at the other end means for detachable engagement with the circular member such means consisting preferably of a hook such as is shown at 17. The eye 16 is of such size as to make a sliding contact with the intermediate portion of the tightener but this size is preferably sufficiently limited so that the ends comprising the springs 9 and 10 may not pass through it. The purpose of making the eye of the size described is merely to prevent accidental detachment of the parts of the tightening device when it is not applied to a tire grip.

The tightening device is preferably applied by connecting the two free ends of the tightener and the free end of the non-extensible member or link 15 with the circular chain at points approximately one-third of the circumference apart, and then stressing the device by pulling up the loop 12 with the consequence that any slack in the circular member is taken up. If resilient members as for example, springs 9 and 10, are used, the circular members of the tire grip will remain normally taut at all times. As adapted to a particular wheel the length of the link 15 should be sufficiently less than the radial distance from the perimeter of the hub to the circular member to cause the eye 16 of the link 15 to clear the hub of the wheel. Preferably there should be ample clearance between the eye 16 and the hub of the wheel to make full allowance for vibration of the device when the wheel is in motion. Furthermore additional clearance is also desirable to allow for the slack in the circular chain arising out of loose adjustment of the tire grip to the wheel or its adjustment with some of the links kinked. The kinked links generally right themselves after some little travel causing additional slack in the circular members. During the action of the adjuster in taking care of this slack, the eye 16 tends to move inwardly toward the hub and if sufficient allowance were not made would come in contact with it. The connecting link 15 being non-extensible it is therefore impossible for the eye 16 and the tightening member to come in contact with the hub either under the influence of vibration caused by motion of the wheel or stress on the link resulting from excessive tightening. Abrasion of the hub and annoying noises that are often characteristic of devices used to serve the general purposes of my device are consequently avoided in so far as they arise out of contact between the hub and parts of the device.

It will be apparent from a consideration of the principle of the invention that the same may be embodied in a variety of forms all of which are intended to be included in the following claims:

1. A tightening device for tire grips comprising a flexible tightener a portion of which is longitudinally resilient, and a non-extensible connecting member having slidable connection with a portion of said tightener intermediate its ends, the free ends of said tightener and said connecting member being provided with means for engagement with the circular member of a tire grip when the latter is applied to a wheel and the length of said connecting member being less than the distance from the hub of the wheel to the said circular member whereby the said tightener will clear the said hub.

2. A tightening device for anti-skid devices comprising a flexible tightener a portion of which is longitudinally resilient, and a non-extensible connecting member having slidable connection with said tightener intermediate the ends of the latter, the free ends of said tightener and of said connecting member being provided with means for engagement with the circular member of a tire grip when the latter is applied to a wheel.

3. A tightening device for tire grips comprising a flexible tightener, a portion of which is longitudinally resilient and a non-extensible connecting member adapted for slidable connection with said tightener at a point approximately midway between the ends of the latter, the length of said connecting member being less than half the length of said tightener.

4. A tightening device adapted for use with tire grips and comprising a flexible tightener, hooks connected with the ends of the tightener and a non-extensible connecting member movably engaging the intermediate portion of the said tightener, a spiral spring interposed in the said tightener between the said hooks, said connecting member being less than half as long as the said tightener.

5. A tightening device for tire grips, including a tightener for engaging the circular chain of the tire grip at separated points, a tightening spring connected to the intermediate portion of said tightener and having means for connecting with the circular chain of the tire grip and a non-extensible connecting member connected to the said tightener, the said non-extensible member being less than half as long as the said tightener.

In testimony whereof I have signed this specification.

JOHN R. REYBURN.